United States Patent
Martin et al.

(10) Patent No.: US 12,399,284 B2
(45) Date of Patent: Aug. 26, 2025

(54) METHOD FOR DETECTING MASKING OF ONE OR MORE SATELLITES, ELECTRONIC DETECTION DEVICE AND ASSOCIATED COMPUTER PROGRAM PRODUCT

(71) Applicant: THALES, Courbevoie (FR)

(72) Inventors: Nicolas Martin, Valence (FR); Muhammed Halep, Valence (FR); Christian Mehlen, Etoile sur Rhône (FR)

(73) Assignee: THALES, Courbevoie (FR)

( * ) Notice: Subject to any disclaimer, the term of this patent is extended or adjusted under 35 U.S.C. 154(b) by 322 days.

(21) Appl. No.: 18/249,251

(22) PCT Filed: Oct. 25, 2021

(86) PCT No.: PCT/EP2021/079542
§ 371 (c)(1),
(2) Date: Apr. 16, 2023

(87) PCT Pub. No.: WO2022/090157
PCT Pub. Date: May 5, 2022

(65) Prior Publication Data
US 2023/0393289 A1    Dec. 7, 2023

(30) Foreign Application Priority Data
Oct. 26, 2020   (FR) ........................... 2010946

(51) Int. Cl.
*G01S 19/51* (2010.01)
(52) U.S. Cl.
CPC ................... *G01S 19/51* (2013.01)
(58) Field of Classification Search
CPC ...................................... G01S 19/51
(Continued)

(56) References Cited

U.S. PATENT DOCUMENTS

| | | | | |
|---|---|---|---|---|
| 8,160,123 | B2* | 4/2012 | Martin | G01S 19/29 375/150 |
| 2008/0129586 | A1* | 6/2008 | Martin | G01S 19/47 342/357.3 |
| 2011/0181463 | A1* | 7/2011 | Chopard | G01S 19/24 342/357.68 |

FOREIGN PATENT DOCUMENTS

EP   1729145 A1   12/2006

OTHER PUBLICATIONS

Ziyi, Jiang, et al., "Multi-Constellation GNSS Multipath Mitigation Using Consistency Checking", GNSS 2011, Proceedings of the 24th International Technical Meeting of the Satellite Division of the Institute of Navigation (Ion GNSS 2011), The Institute of Navigation, 8551 Rixlew Lane Suite 360 Manassas, VA 20109, USA, Sep. 23, 2011 (Sep. 23, 2011), p. 3889.
(Continued)

*Primary Examiner* — Bo Fan
(74) *Attorney, Agent, or Firm* — Soquel Group LLC

(57) ABSTRACT

A method for detecting masking of one or more satellites by an obstacle for a GNSS receiver on board a movable carrier, including receiving, for each one of M satellites, a code pseudo-distance measurement and a variation of carrier pseudo-distances, computing of a definite position of the receiver and a computed position of each satellite, detecting a masking of at least one satellite on the basis of the following operations: computing, at a computation instant and for each satellite, of a computed pseudo-distance and a pseudo-distance reconstructed at a previous time, and detecting masking of at least one satellite by analyzing a magnitude, called residue, computed by applying a least squares algorithm.

11 Claims, 4 Drawing Sheets

(58) Field of Classification Search
USPC .................. 342/352, 357.68, 357.3; 375/150
See application file for complete search history.

(56) References Cited

OTHER PUBLICATIONS

Cheng Cheng, Jean-Yves Tourneret, Quan Pan, Vincent Calmettes, "Detecting, estimating and correcting multipath biases affecting GNSS signals using a marginalized likelihood ratio-based method", Signal Processing, Elsevier, 2016, vol. 118, pp. 221-234.
Giremus, Audrey, Grolleau, Julie, "An Unscented Kalman Filter Based Maximum Likelihood Ratio for NLOS Bias Detection in UMTS Localization", Equipe Signal et Image in the Dpt. LAPS, UMR CNRS 5218 IMS, Universit Bordeaux 1, 33405 Talence Cedex, France, 2008.
FR 2010946, INPI Rapport de Recherche Preliminaire, Jul. 14, 2021, 2 pages.
International Search Report, PCT/EP/2021/079542, Feb. 3, 2022, 3 pages.
FR 2010946, Written Opinion, Jul. 23, 2021, 7 pages.
PCT/EP/2021/079542, International Written Opinion, Feb. 3, 2022, 10 pages.

* cited by examiner

|       | K-5    | ... | K-2    | K-1    | K    |
|-------|--------|-----|--------|--------|------|
| Sat_1 | DR_k-5 | ... | DR_k-2 | DR_k-1 | DR_k |
| Sat_2 | DR_k-5 | ... | DR_k-2 | DR_k-1 | DR_k |
| Sat_3 | DR_k-5 | ... | DR_k-2 | DR_k-1 | DR_k |
| Sat_4 | DR_k-5 | ... | DR_k-2 | DR_k-1 | DR_k |
| Sat_5 | DR_k-5 | ... | DR_k-2 | DR_k-1 | DR_k |
| Sat_6 | DR_k-5 | X   | DR_k-2 | DR_k-1 | DR_k |
| Sat_7 | DR_k-5 | ... | X      | DR_k-1 | DR_k | a

|       | K-5 | ... | K-2    | K-1    | K    |
|-------|-----|-----|--------|--------|------|
| Sat_1 | //  | //  | DR_k-2 | DR_k-1 | DR_k |
| Sat_2 | //  | //  | DR_k-2 | DR_k-1 | DR_k |
| Sat_3 | //  | //  | DR_k-2 | DR_k-1 | DR_k |
| Sat_4 | //  | //  | DR_k-2 | DR_k-1 | DR_k |
| Sat_5 | //  | //  | DR_k-2 | DR_k-1 | DR_k |
| Sat_6 | //  | X   | DR_k-2 | DR_k-1 | DR_k |
| Sat_7 | //  | //  | X      | DR_k-1 | DR_k | b

|       | K-5 | ... | K-2    | K-1    | K    |
|-------|-----|-----|--------|--------|------|
| Sat_1 | //  | //  | DR_k-2 | DR_k-1 | DR_k |
| Sat_2 | //  | //  | DR_k-2 | DR_k-1 | DR_k |
| Sat_3 | //  | //  | DR_k-2 | DR_k-1 | DR_k |
| Sat_4 | //  | //  | DR_k-2 | DR_k-1 | DR_k |
| Sat_5 | //  | //  | DR_k-2 | DR_k-1 | DR_k |
| Sat_6 | //  | //  | DR_k-2 | DR_k-1 | DR_k |
| Sat_7 | //  | //  | X      | DR_k-1 | DR_k | c

FIG.4

METHOD FOR DETECTING MASKING OF ONE OR MORE SATELLITES, ELECTRONIC DETECTION DEVICE AND ASSOCIATED COMPUTER PROGRAM PRODUCT

CROSS-REFERENCE TO RELATED APPLICATIONS

This application claims benefit under 35 USC § 371 of PCT Application No. PCT/EP2021/079542 entitled METHOD FOR DETECTING MASKING OF ONE OR MORE SATELLITES, ELECTRONIC DETECTION DEVICE AND ASSOCIATED COMPUTER PROGRAM PRODUCT, filed on Oct. 25, 2021 by inventors Nicolas Martin, Muhammed Halep and Christian Mehlen. PCT Application No. PCT/EP2021/079542 claims priority of French Patent Application No. 20 10946, filed on Oct. 26, 2020.

FIELD OF THE INVENTION

The present invention relates to a method for detecting a masking of one or a plurality of satellites by an obstacle, for a GNSS receiver on board a mobile carrier.

The present invention further relates to an electronic detection device and a computer program product associated with the method.

The invention is applicable to the field of tracking, by satellites, the position of mobile object(s). More particularly, the invention is applicable to land motor and rail vehicles, sea vehicles, air vehicles, and to an object worn by a user.

BACKGROUND OF THE INVENTION

In a manner known per se, the positioning of an object can be achieved by means of a GNSS receiver receiving GNSS signals coming from satellites.

The abbreviation GNSS is the abbreviation for Global Navigation Satellite System. An example of such a system is the Global Positioning System (GPS) or the GALILEO system.

A satellite is said to be visible to a GNSS receiver if the GNSS receiver receives GNSS signals from the satellite.

A satellite is said to be visible and hooked-up if the GNSS receiver produces pseudo-distance measurements between the antenna thereof and the antenna of the satellite and demodulates a navigation message contained in a signal from the satellite.

When the GNSS receiver is operating in an open environment, the reception by the receiver, of GNSS signals from 4 separate satellites, is generally sufficient for determining the position of the GNSS receiver in space.

The position is determined in particular as a function of the travel time of the GNSS signals coming from each satellite.

In an open environment, i.e. without obstacles, a path traveled by the GNSS signals sent by each satellite and received by the GNSS receiver is substantially linear and direct. In such a case, the signals are called direct signals.

The term "direct" herein means a path, traveled by signals, without bouncing off any surface before reaching a target thereof.

However, when the environment is hindered by at least one obstacle, such as a building or any other object present in particular in the urban environment, the reception of GNSS signals is no longer only direct.

More specifically, GNSS signals from at least one satellite are likely to bounce off at least one surface of the obstacle(s) before reaching the GNSS receiver. Such signals are called indirect signals, as opposed to direct signals.

If the receiver receives both direct and indirect signals from the same satellite, the receiver is in a so-called multipath situation.

In a multipath situation, if the amplitude of the indirect signals is small compared to the amplitude of the direct signals, then known methods, in particular based on multi-correlators, are used for rejecting the indirect signals and thus escaping from the multi-path situation.

However, when the amplitude of the indirect signals dominates the amplitude of the direct signals, the aforementioned methods are ineffective. Such a situation is called NLOS (Non-Line of Sight).

NLOS situations arise in particular when the mobile carrier, carrying the GNSS receiver, moves in a hindered environment. As explained above, a hindered environment can comprise any structure, either natural or artificial, likely to be interposed in the path between the GNSS receiver and a satellite. Thus, from the point of view of the GNSS receiver, the structure masks the satellite. The above then leads to a strong attenuation of the amplitude of the direct signals compared to the amplitude of the indirect signals. Such an NLOS situation is represented in FIG. 1 where the direct signals are denoted by D and the indirect signals are denoted by M.

In an NLOS situation, the determination of the position of the receiver is altered. Indeed, the distance between the masked satellite and the receiver is fictiously extended because of the bounce or bounces of the signals coming from the masked satellite on one surface or on surfaces of the structures. In the example shown in FIG. 1, the determined position of the receiver is then the position P'.

A person skilled in the art would note that it is impossible for a GNSS receiver to know, a priori, whether the GNSS signals received are direct or indirect.

The documents "An unscented Kalman filter-based maximum likelihood ratio for NLOS bias detection, A. Giremus et al., EUSIPCO 2008" and "Detecting, estimating and correcting multipath biases affecting GNSS signals using a marginalized likelihood ratio-based method, C. Cheng et al, ISAE, 2016" describe methods for detecting NLOS situation and for determining one satellite or satellites from a constellation of satellites, responsible for the NLOS situation. To this end, such methods evaluate a log-likelihood ratio associated with the occurrence of a bias in the GNSS signals received from a respective satellite.

However, such method entails a large computational load. Such a computational load is in particular discriminating for on-board systems having moderate computational power.

SUMMARY OF THE DESCRIPTION

The goal of the invention is thus to provide a method for detecting a masking of one or a plurality of satellites.

To this end, the subject matter of the invention is a method for detecting a masking of one or a plurality of satellites, by an obstacle for a GNSS receiver on a mobile carrier, the method comprising the following steps:
  continuous reception, at each acquisition instant and for each of the M satellites, of a code pseudo-distance measurement and of a variation of carrier pseudo-distances, M being an integer;
  computation of a defined receiver position and a computed position of each satellite;

detection of a masking of at least one satellite from the following sub-steps:
for each satellite and for each reception instant, computational, at an instant of computation, a pseudo-distance computed from the defined receiver position and the computed position of each satellite and computation of a pseudo-distance reconstructed at an earlier instant from the code pseudo-distance and from each variation of carrier pseudo-distances between the earlier instant and the instant of computation;
detection of a masking of at least one satellite by analyzing a quantity called residue, computed by applying a least squares algorithm, from the measurement of code pseudo-distances at the instant of computation, definite receiver positions and computed positions of each of the satellites at the instant of computation and at the earlier instant, from the computed pseudo-distances and the reconstructed pseudo-distance.

According to other advantageous aspects of the invention, the detection method comprises one or a plurality of the following features, taken individually or according to all technically possible combinations:

prior to the computation sub-step, the method comprises the following steps:
generating at an instant, called instant of generation, of at least one group of N satellites, the satellites of the or each group of N satellites being chosen from the M satellites, N being an integer less than or equal to M, and
for the or each group of N satellites, associating an instant of birth preceding the instant of generation from which the GNSS signals from each of the satellites in the group of N satellites were all received without interruption,
the detection step being iterated for each group,
during the computation sub-step, the instant of computation being equal to the instant of generation and the earlier instant being equal to the instant of birth of the group;
the detection step comprises, for each group, the following sub-steps, subsequent to the computation sub-steps:
if, for at least one group of satellites, the residue is greater than a first threshold, then detection of masking of at least one satellite in the group and reiteration of the sub-step of computing the residue for each subgroup of said group, each subgroup comprising each satellite in the group except one; and
if, for a subgroup, the residue is less than a second threshold, then determining a masked satellite as the satellite absent from the subgroup;
the computation step further comprises, for each acquisition instant, the computation of:
an estimated signal-to-noise ratio;
an elevation angle of each satellite from the definite position of the GNSS receiver and from the computed position of the satellite;
the generation step comprising a sub-step of selecting, for each satellite, GNSS signals at each acquisition instant for which:
the signal-to-noise ratio of the GNSS signals coming from the satellite at said instant satisfying a first criterion; and
the elevation angle of the satellite at said instant meeting a second criterion the generation step further comprising the following sub-steps:
generating a first group comprising the N satellites the GNSS signals from which are selected, during the selection sub-step, since an instant which is the earliest with respect to the instant of generation;
generating a second group from the first group, the second group comprising each satellite of the first group and the satellite, absent from the first group, the GNSS signals from which are selected, during the selection sub-step, since an instant which is the earliest with respect to the instant of generation; and
if at least one satellite the GNSS signals from which have been selected during the selection sub-step at the instant of generation and which is absent from each already generated group, then reiterating the second generation sub-step from the last generated group;
the sub-step of computing the residue further comprises, for each group of satellites:
computing a reconstructed pseudo-distance for each satellite, from the code pseudo-distance at the instant of generation and the carrier pseudo-distance variations between the instant of birth and the instant of generation,
computing a first, a second, respectively, approximate solution of a first, a second, respectively, linear system, each linear system correspondingly depending on the first and the second computed pseudo-distances, on the code pseudo-distance at the instant of generation and on the reconstructed pseudo-distance; and
computing the residue from the first and second approximate solutions;
the generation, association and detection steps being reiterated periodically.

A further subject matter of invention is a computer program including software instructions which, when executed by a computer, implement a detection method as defined hereinabove.

The invention further relates to an electronic detection device comprising technical means suitable for implementing the detection method, as defined hereinabove.

BRIEF DESCRIPTION OF THE DRAWINGS

The features and advantages of the invention will appear upon reading the following description, given as an example, but not limited to, and making reference to the enclosed drawings, wherein:

FIG. 4 is an explanatory diagram of a step of generation of the method shown in FIG. 3, illustrated in an example.

DETAILED DESCRIPTION OF EMBODIMENTS

Figure 1:
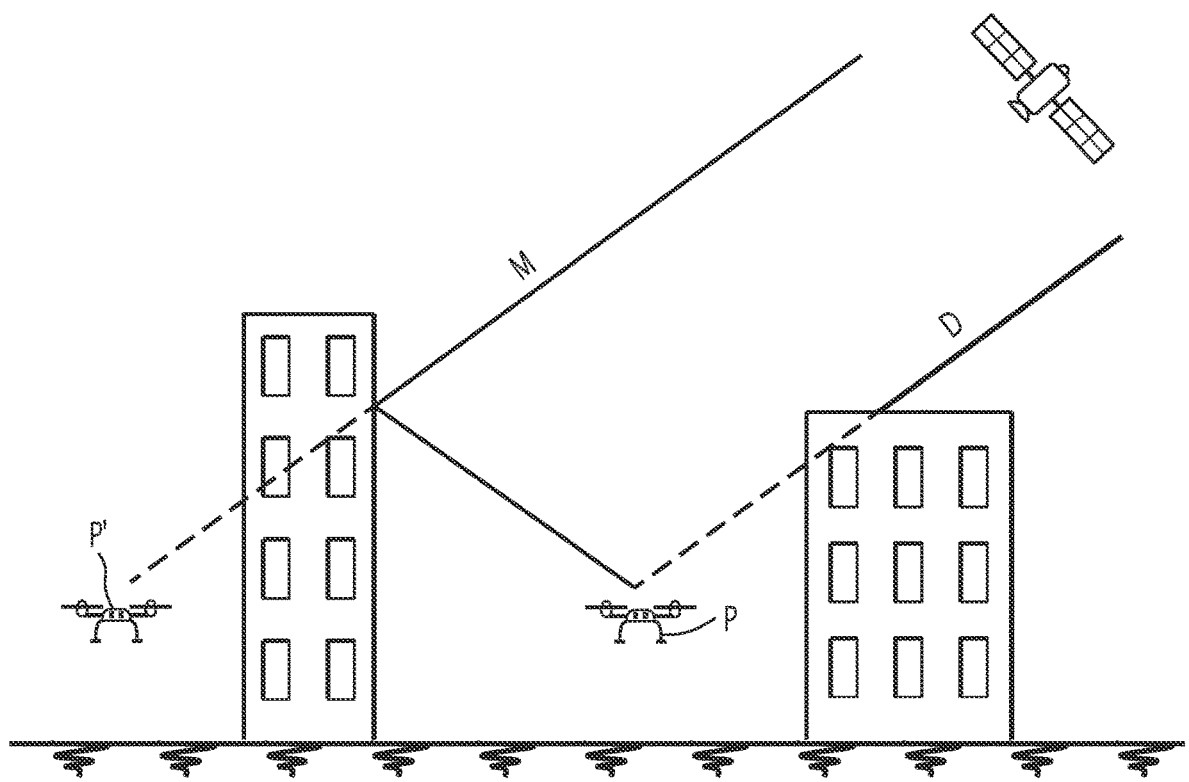
FIG. 1 is a schematic view explaining the multi-path problem when geolocating a carrier in a hindered environment.
Figure 2:
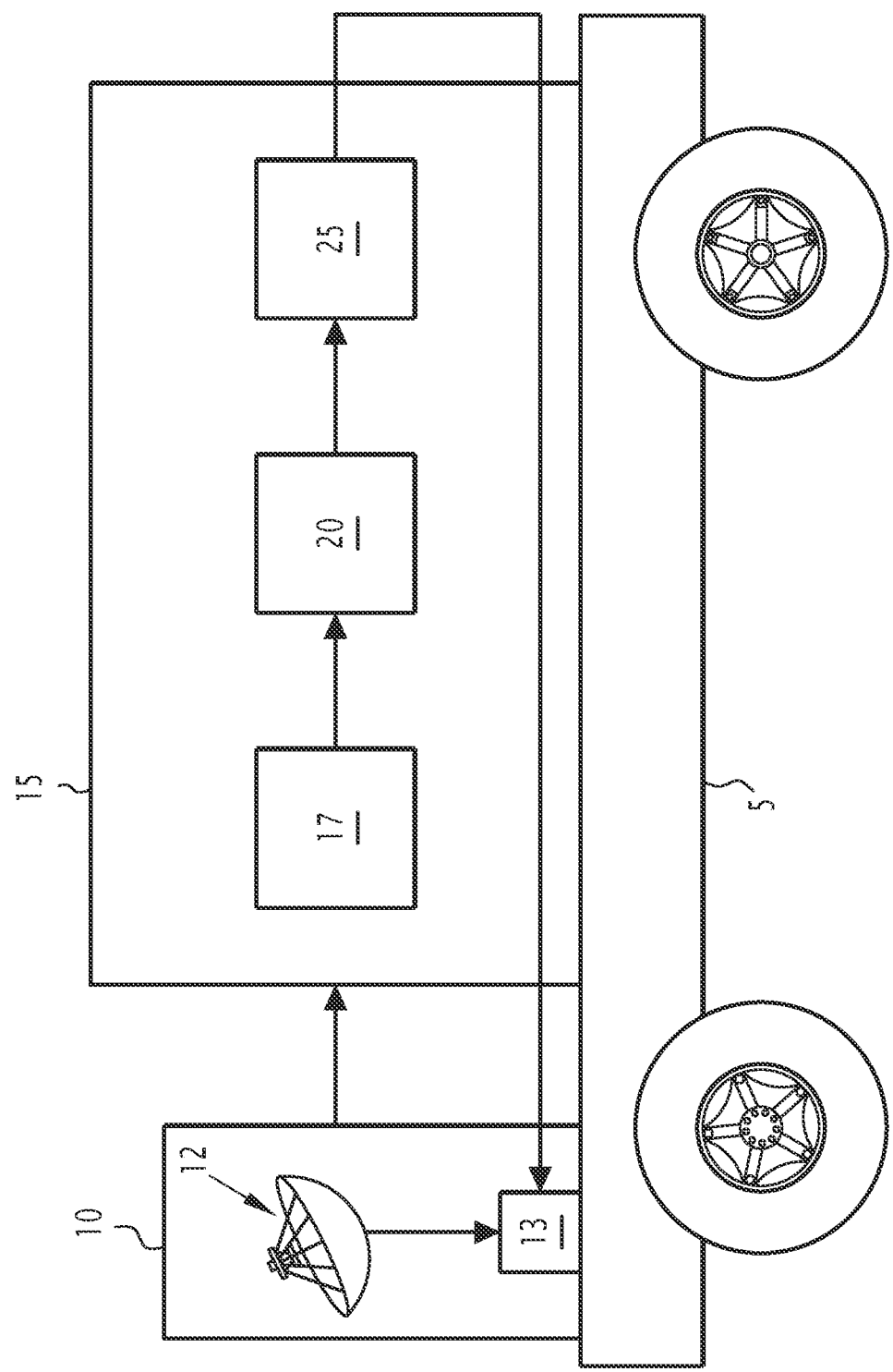
FIG. 2 is a schematic view of a detection, on-board a carrier, according to the invention.

With reference to FIG. 2, a carrier 5 is mobile in an environment. The carrier 5 carries on-board, a GNSS receiver 10 apt to receive GNSS signals and an electronic detection device 15 configured for detecting a masking of one or a plurality of satellites and, where appropriate, for determining a list of satellites masked by an obstacle, when GNSS signals are received by the GNSS receiver 10.

The carrier 5 is e.g. an aircraft, such as a drone, moving in space in three dimensions, or a land or sea vehicle moving in a plane in two dimensions or e.g. a railway vehicle moving along one direction along a railway track.

The GNSS receiver 10 is configured for receive GNSS signals from satellite(s) belonging to the same GNSS system, such as e.g. the GPS system. The GNSS receiver 10 comprises e.g. a reception antenna 12 known per se and a computation module 13.

The antenna 12 is configured for receiving GNSS signals from a plurality of satellites and sending them in the form of electrical signals to the computation module 13.

The GNSS signals comprise, for each visible and hooked-up satellite $S_i$, an identifier of the satellite $S_i$, an instant of sending $t_{em,i}$ the signals by the satellite $S_i$ and the ephemerides of the satellite $S_i$. Each piece of information in the GNSS signals is encoded on a carrier which is sent by the satellite.

The computation module 13 is e.g. apt to determine the position of the receiver 10 from the GNSS signals using techniques known per se. The computation module 13 is also configured for computing and sending to the detection device 15, at each acquisition instant $t_h$ and for each visible and hooked-up satellite $S_i$, the following information: a code pseudo-distance measurement PR(i,h), a measurement of the variation of carrier pseudo-distance DR(i,h) between the acquisition instant $t_h$ and an earlier instant $t_{h-1}$ e.g. according to the equation:

$$DR(i,h) = PR_{car}(i,h) - PR_{car}(i,h-1) \quad [\text{MATH 1}]$$

where $PR_{car}(i,h)$ is a pseudo-carrier distance at the acquisition instant $t_h$.

The computation module 13 is also configured for sending to the detection device 15, the ephemerides of each satellite $S_i$ and the instant of sending the signals from each satellite.

The acquisition instants $t_h$ are periodically spaced according to a first predetermined frequency $f_1$.

The detection device 15 comprises an input module 17, a processing module 20 and an output module 25.

According to a preferred embodiment, the input module 17, the processing module and the output module 25 are each implemented in the form of software stored in one or a plurality of storage means (such as a hard disk or a flash disk) and implemented by one or a plurality of processors, memory (RAM) and other computer components known per se. Such components are then included in the same computer or in different computers/servers. In the latter case, the computers/servers being connected by a local or global network.

Furthermore or alternatively, at least some of the modules 17, 20, and 25 take the form, at least partially, of an independent electronic component, such as e.g. a programmable logic circuit such as a field-programmable gate array (FPGA) or other.

The input module 17 is configured for receiving, at each acquisition instant $t_h$, the information computed by the computation module 13, namely representative signals.

The input module 17 is configured for sending the received information to the processing module 20.

The processing module 20 is configured for processing the signals coming from the GNSS receiver 10 in order to detect the presence of a masked satellite. The processing module 20 is configured for determining, where appropriate, the list of masked satellite(s). For this purpose, the processing module 20 is configured for processing GNSS signals as described below in relation to the detection method according to the invention.

The output module 25 is connected to the processing module 20. The output module is configured for sending to a user or to another electronic device (not shown), information relating to the presence or absence of masked satellite (s), and, where appropriate, a list of masked satellite(s).

If the output module 25 is configured for communicating with a user, the communication takes place e.g. by means of a screen (not shown). In the case where the output module 25 is intended for communicating with another electronic device, the output module 25 is e.g. intended for communicating with the computation module 13. The output module 25 is then e.g. configured for sending a warning signal to the computation module 13 in the event of detection of masked satellites, and, where appropriate, for sending the list of masked satellites to the computation module 13.

Figure 3:
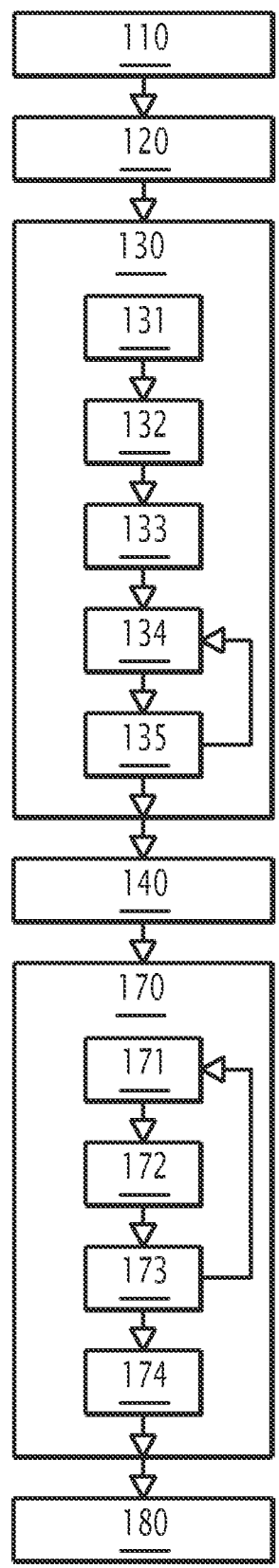
FIG. 3 is an flow chart of a detection method used by the detection device shown in FIG. 2.

The detection method implemented by the electronic detection device 15 according to the invention will now be explained with reference to FIG. 3 which shows a flowchart of the method and to FIG. 4 illustrating a step of the method in an example.

Initially, the carrier 5 moves in a hindered environment and the GNSS receiver 10 receives, via the antenna 12 thereof, GNSS signals from a plurality of satellites. The computation module 13 computes the information mentioned above and sends the information to the detection device 15.

During a reception step 110, the input module 17 receives, at each acquisition instant $t_h$ and for each of the M satellites $S_i$, the code pseudo-distance measurement PR(i,h) and the variation of the carrier pseudo-distance DR(i,h).

The M satellites correspond to the satellites which are visible and hooked-up by the GNSS receiver 10. The visible satellites as defined herein are satellites the GNSS signals from which reach the GNSS receiver 10, without considering whether the GNSS signals from the satellites travel a direct or an indirect path.

The display step 110 is e.g. implemented by the input module 17.

The following steps are, unless explicitly stated otherwise, implemented by the processing module 20.

During a computation step 120, the processing module 20 computes, for each acquisition instant $t_h$:
- a computed position $(x_i(h), y_i(h), z_i(h))$ of each satellite $S_i$ from measurements of code pseudo-distances PR(i,h) and ephemerides of the satellite also contained in the received GNSS signals, according to a technique known per se;
- a definite position $(x(h), y(h), z(h))$ of the GNSS receiver, also according to a technique known per se;
- an estimated signal-to-noise ratio $C/N0(i,h)$ for each satellite $S_i$;
- an elevation angle (i,h) of each satellite from the definite position $(x(h), y(h), z(h))$ of the GNSS receiver and the computed position $(x_i(h), y_i(h), z_i(h))$ of said satellite $S_i$, using a technique known per se.

Thus, at the end of the computation step 120, the processing module 20 has the quantities computed at each acquisition instant $t_h$ for which the GNSS signals have been received by the receiver 10.

In a variant, the computation step 120 is carried out by the computation module 13 not included in the detection device 15. The aforementioned computed elements are then received by the input module 17, from the computation module 13, and sent to the processing module 20.

During a generation step 130, the processing module 20 generates, at an instant of generation $t_k$, at least one group $G_j$ of satellites, and advantageously a plurality of groups $G_j$ of satellites. For this purpose, the processing module 20 applies e.g. the following sub-steps, discussed in detail as an example with reference to FIG. 4.

During a selection sub-step 131, the processing module 20 selects, for each satellite $S_i$, the GNSS signal data at each acquisition instant $t_h$ for which:
- the signal-to-noise ratio C/N0(i,h) of the GNSS signals from the satellite $S_i$ at the acquisition instant $t_h$ meets a first criterion; and
- the elevation angle δ(i,h) of the satellite $S_i$ at the acquisition instant $t_h$ meets a second criterion.

The first criterion is e.g. that the signal-to-noise ratio C/N0(i,h) is greater than 30 dBHz. The second criterion is e.g. that the elevation angle δ(i,h) is greater than 5°.

Thus, GNSS signals from a satellite $S_i$ will be taken into account in the following sub-steps only at the acquisition instants $t_h$ for which the signal-to-noise ratio C/N0(i,h) of the satellite $S_i$ meets the first criterion and the elevation angle δ(i,h) of the satellite $S_i$ meets the second criterion.

During a classification sub-step 132, the processing module 20 orders the satellites $S_i$ in descending order of valid reception period without discontinuity. A valid reception as defined herein means a reception of GNSS signals which have been selected during the selection sub-step 131. The continuous reception period corresponds to a period since which the input module 17 receives the GNSS signals in an uninterrupted way.

In other words, during the classification sub-step 132, the processing module 20 classifies the satellites $S_i$ by decreasing period since which their GNSS signals are selected without interruption. Thus, the satellite, named hereafter $S_1$, corresponds to the satellite having the longest valid reception period without discontinuity. On the other hand, the satellite named hereafter $S_M$ corresponds to the satellite having the shortest valid reception period without discontinuity. A person skilled in the art would note that, if the GNSS signals from a respective satellite $S_i$ at the instant of generation $t_k$ are not selected or if no signal is received from the satellite at the instant of generation, then the valid reception period without discontinuity of the satellite $S_i$ is equal to 0.

During a first generation sub-step 133, the processing module 20 generates a first group $G_1$ of satellites. The first group $G_1$ of satellites comprises N satellites, N being a predetermined integer, advantageously equal to 5 or 6. For this purpose, the processing module 20 generates the first group $G_1$ as comprising N first satellites $S_1$ to $S_N$, after the classification thereof during the classification sub-step 132, as represented in FIG. 4 at point a.

FIG. 4 shows several double-entry tables, of which an abscissa represents the successive acquisition instants $t_h$ and an ordinate represents the satellites classified according to the valid reception period thereof without discontinuity. Each box in the table is associated with an acquisition instant $t_h$ and a satellite $S_i$. Each box is either filled with an indication indicating that a variation of pseudo-distance of a valid GNSS signal has been received at the acquisition instant $t_h$ for the satellite $S_i$, or with a cross otherwise. In FIG. 4 at point a, the first group $G_1$, the data of which are framed by a bold line, includes the first five satellites.

In FIG. 4 at point a, the valid reception period without discontinuity of each of the first five satellites, corresponds to the difference between the instant of generation $t_k$ and the instant $t_{k-5}$. The valid reception period without discontinuity of the sixth satellite $S_6$ is equal to the difference between the instant of generation $t_k$ and the instant $t_{k-2}$. Finally, for the seventh and last satellite $S_7$, the valid reception period without discontinuity is equal to the difference between the instant of generation $t_k$ and the instant $t_{k-1}$.

During a generation sub-step 134, the processing module 20 generates a second group $G_2$ of satellites from the first group $G_1$ of satellites. For this purpose, the processing module 20 generates a group $G_j$ comprising N the satellites of the first group $G_1$ and the satellite, absent from the first group $G_1$, having the longest valid reception period without discontinuity. In other words, the second group $G_2$ comprises N the first satellites, and the satellite $S_{N+1}$ corresponding to the absent satellite $S_i$ of the first group $G_1$ having the longest valid reception period without discontinuity.

In the example shown in FIG. 4, the second group $G_2$ of satellites thus comprises six satellites, namely the first six satellites, after the classification sub-step 132, as framed in bold at point b.

During a reiteration sub-step 135, if no group $G_j$ comprises all the satellites for which data have been selected during the selection step 131, then the processing module 20 reiterates the second generation sub-step 135 from the last generated group $G_j$.

In the example shown in FIG. 4, signal data coming from each of the satellites has been selected, but the second group $G_2$ comprises only six satellites, the second generation sub-step 134 then being reiterated from the second group $G_2$ of satellites. Thereby, a third group $G_3$ is generated. The third group $G_3$ comprises each of the satellites of the second group and the remaining satellite having the longest valid reception period without discontinuity, namely the seventh satellite $S_7$. The third group $G_3$ thus includes the seven satellites from which data from GNSS signals have been selected, as shown in bold at point c. The second sub-step of generation 134 is thus not reiterated a third time.

During an association step 140, the processing module 20 associates an instant of birth $t_n$ with each group of satellites $G_j$. The instant of birth $t_n$ corresponds to an instant from which valid GNSS signals from each of the satellites have been received without discontinuity. In other words, the instant of birth $t_n$ of a respective group $G_j$ corresponds to the instant of generation $t_k$ minus the shortest valid reception period without discontinuity among the lengths of time of each of the satellites of the group.

In the example shown in FIG. 4, the instant of birth $t_n$ of the first group $G_1$ is thus $t_{k-5}$ because valid signals from each of the satellites have been received, by the input module 17, without discontinuity since the instant $t_{k-5}$. The instant of birth $t_n$ associated with the second group $G_2$ is the instant $t_{k-2}$ because valid signals have been received without discontinuity from five of these satellites from the instant $t_{k-5}$ and valid signals have been received without discontinuity from the sixth satellite $S_6$, only from the instant $t_{k-2}$. With regard to the third group $G_3$, for reasons similar to the second group, the instant of birth $t_n$ is the instant $t_{k-1}$.

During a detection step 170, the processing module 20 detects the presence of at least one masked satellite, and, where appropriate, determines the list of masked satellite(s). To this end, the processing module 20 analyzes, for each group $G_j$, a quantity, called residue $R_{G_j}(k,n)$, specific to the group $G_j$, by comparison with a first threshold. The residue $R_{G_j}(k,n)$ is obtained from the GNSS signals received from the satellites of the group $G_j$ since the instant of birth $t_n$ of the group $G_j$.

More precisely, the detection step 170 comprises the following sub-steps.

During a computation sub-step 171, the processing module 20 computes, for each group $G_j$ of satellites, the residue representative of an inconsistency of the GNSS signals received from at least one satellite of the group $G_j$ with respect to the other satellites of the group $G_j$.

For a group $G_j$ comprising N satellites, N being an integer less than or equal to M, the instant of birth of which is the instant $t_n$, the processing module 20 computes, at the instant of generation $t_k$ and at the instant of birth $t_n$, a pseudo-distance computed respectively $PR_{cal}(i,k)$ and $PR_{cal}(i,n)$, linked to each satellite $S_i$ of the group $G_j$, e.g. according to the formulas:

$$PR_{cal}(i, k) = \sqrt{(x(k) - x_i(k))^2 + (y(k) - y_i(k))^2 + (z(k) - z_i(k))^2} \quad \text{[MATH 1]}$$

$$PR_{cal}(i, n) = \sqrt{(x(n) - x_i(n))^2 + (y(n) - y_i(n))^2 + (z(n) - z_i(n))^2};$$

where, as a reminder:

(x(k),y(k),z(k)) and (x(n),y(n),z(n)) correspond to the definite positions of the GNSS receiver 10, at the instants of generation $t_k$ and of birth $t_n$, respectively; and $(x_i(k), y_i(k), z_i(k))$ and $(x_i(n), y_i(n), z_i(n))$ correspond to the computed positions of the satellite $S_i$ at the instant of generation $t_k$ and of birth $t_n$, respectively.

Again during the computation sub-step 171, the processing module 20 computes a first estimated position, valid at the instant of generation $t_k$, by applying a PVT (Position Velocity Time) algorithm known per se, from the code pseudo-distances PR(i,k) and the computed pseudo-distances $PR_{cal}(i,k)$ of each satellite $S_i$.

The processing module 20 computes, for each satellite $S_i$, a reconstructed pseudo-distance PR'(i,n,k), valid at the instant of birth $t_n$, from the variations of the carrier pseudo-distance DR(i,h) between the instant of birth $t_n$ and the instant of generation $t_k$ and from the code pseudo-distance PR(i,k) at the instant of generation $t_k$ e.g. according to the following formula:

$$PR'(i, n, k) = PR(i, k) - \sum_{p=0}^{k-n-1} DR(i, k - p). \quad \text{[MATH 2]}$$

The processing module 20 also computes a second estimated position, valid at the instant of birth $t_n$, by applying the PVT algorithm, from the reconstructed pseudo-distances PR'(i,n,k) and the computed pseudo-distances of each satellite $S_i$.

Again during the computation sub-step 171, the processing module 20 computes a first pseudo-distance difference vector $Z_k$, each component of which corresponds, for each satellite of the group $G_j$, to the difference between the code pseudo-distance PR(i,k) from the received GNSS signals and the pseudo-distance computed $PR_{cal}(i,k)$ at the instant of generation $t_k$, and a second pseudo-distance difference vector $Z_{n,k}$, each component of which corresponds, for each satellite of the group, to the difference between the reconstructed pseudo-distance PR'(i,n,k) and the pseudo-distance computed $PR_{cal}(i,n)$ at the instant of birth $t_n$. The first and second pseudo-distance difference vectors are then obtained according to the following formula:

$$Z_k = \begin{bmatrix} PR(1, k) - PR_{cal}(1, k) \\ \vdots \\ PR(N, k) - PR_{cal}(N, k) \end{bmatrix}; \text{ and} \quad \text{[MATH 3]}$$

-continued
$$Z_{n,k} = \begin{bmatrix} PR'(1, n, k) - PR_{cal}(1, n) \\ \vdots \\ PR'(N, n, k) - PR_{cal}(N, n) \end{bmatrix}.$$

The processing module 20 also computes, for the instant of generation $t_k$ and for the instant of birth $t_n$, a first $H_k$ and a second $H_n$ observation matrix, respectively, e.g. according to the following formulae:

$$H_k = \begin{bmatrix} \cos\alpha_1(k) & \cos\beta_1(k) & \cos\gamma_1(k) & 1 \\ \vdots & \vdots & \vdots & \vdots \\ \cos\alpha_N(k) & \cos\beta_N(k) & \cos\gamma_N(k) & 1 \end{bmatrix}; \text{ and} \quad \text{[MATH 4]}$$

$$H_n = \begin{bmatrix} \cos\alpha_1(n) & \cos\beta_1(n) & \cos\gamma_1(n) & 1 \\ \vdots & \vdots & \vdots & \vdots \\ \cos\alpha_N(n) & \cos\beta_N(n) & \cos\gamma_N(n) & 1 \end{bmatrix};$$

where:

$$\cos\alpha_i(n) = \frac{x(n) - x_i(n)}{PR_{cal}(i, n)}, \cos\alpha_i(k) = \frac{x(k) - x_i(k)}{PR_{cal}(i, k)};$$

$$\cos\beta_i(n) = \frac{y(n) - y_i(n)}{PR_{cal}(i, n)}, \cos\beta_i(k) = \frac{y(k) - y_i(k)}{PR_{cal}(i, k)};$$

$$\cos\gamma_i(n) = \frac{z(n) - z_i(n)}{PR_{cal}(i, n)}, \cos\gamma_i(k) = \frac{z(k) - z_i(k)}{PR_{cal}(i, k)}.$$

The first $Z_k$, the second $Z_{n,k}$, pseudo-distance difference vectors respectively and the observation matrices ($H_k$ and $H_n$), are used for defining a system of linear equations for which an unknown is a first $X_k$ and a second $X_{n,k}$ position deviation vector respectively, of the GNSS receiver at the instant of generation $t_k$ and at the instant of birth $t_n$, respectively. The system of linear equations is then written as follows:

$$Z_k = H_k \cdot X_k; \text{ and} \quad \text{[MATH 5]}$$

$$Z_{n,k} = H_n \cdot X_{n,k};$$

where:

$$X_k = \begin{bmatrix} \Delta x_k \\ \Delta y_k \\ \Delta z_k \\ \Delta t_k \end{bmatrix} \text{ and } X_{n,k} = \begin{bmatrix} \Delta x_{n,k} \\ \Delta y_{n,k} \\ \Delta z_{n,k} \\ \Delta t_{n,k} \end{bmatrix}.$$

The coefficients of the first $X_k$ and second $X_{n,k}$ position deviation vectors are the unknowns of the linear system of equations.

A person skilled in the art would note that if the group $G_j$ comprises more than four satellites, the said system of linear equations does not always have a solution. However, an approximate solution can be obtained by applying a least squares algorithm, known per se, leading in the present case, to the following formulae:

$$\widehat{X_k} = (H_k^T \cdot H_k)^{-1} \cdot H_k^T \cdot Z_k; \text{ and} \quad \text{[MATH 6]}$$

$$\widehat{X_{n,k}} = (H_n^T \cdot H_n)^{-1} \cdot H_n^T \cdot Z_{n,k};$$

$$\widehat{X_k} = \begin{bmatrix} \widehat{\Delta x_k} \\ \widehat{\Delta y_k} \\ \widehat{\Delta z_k} \\ \widehat{\Delta t_k} \end{bmatrix} \widehat{X_{n,k}} = \begin{bmatrix} \widehat{\Delta x_{n,k}} \\ \widehat{\Delta y_{n,k}} \\ \widehat{\Delta z_{n,k}} \\ \widehat{\Delta t_{n,k}} \end{bmatrix}$$

where:

$\widehat{X_k}$ and $\widehat{X_n}$ are the approximate solutions of the first $X_k$ and second $X_n$ position deviation vectors, respectively;

$(\ldots)^T$ corresponds to the matrix transpose operator; and $(\ldots)^{-1}$ corresponds to the matrix inverse operator.

The processing module 20 computes the residue as the difference between approximation errors made during the computation of the solution of each of the systems of linear equations by the least squares algorithm.

For this purpose, the processing module 20 computes the first Position$_{G_j}$(k) and second Position$_{G_j}$'(n) positions estimated at the instant of generation $t_k$ and instant of birth $t_n$ from the definite positions of the receiver at the instant of generation $t_k$ and instant of birth $t_n$ at the first $\widehat{X_k}$ and second $\widehat{X_n}$ approximate solutions, according to the equation:

$$\text{Position}_{G_j}(k) = \begin{bmatrix} x_{Gj}(k) \\ y_{Gj}(k) \\ z_{Gj}(k) \end{bmatrix} = \begin{bmatrix} x(k) \\ y(k) \\ z(k) \end{bmatrix} + \begin{bmatrix} \widehat{\Delta x_k} \\ \widehat{\Delta y_k} \\ \widehat{\Delta z_k} \end{bmatrix}$$

$$\text{Position}'_{G_j}(k, n) = \begin{bmatrix} x'_{Gj}(n, k) \\ y'_{Gj}(n, k) \\ z'_{Gj}(n, k) \end{bmatrix} = \begin{bmatrix} x(n) \\ y(n) \\ z(n) \end{bmatrix} + \begin{bmatrix} \widehat{\Delta x_{n,k}} \\ \widehat{\Delta y_{n,k}} \\ \widehat{\Delta z_{n,k}} \end{bmatrix}$$

The processing module 20 then recomputes, for each satellite $S_i$, the pseudo-distance computed $PR_{cal}(i,k)$ at the instant of generation $t_k$ from the first position Position$_{G_j}$(k) and a computed pseudo-distance reconstituted $PR_{cal}'(i,k,n)$ at the instant of birth $t_n$ from the second position Position$_{G_j}$'(k,n) according to the formula:

$$PR_{cal}(i, k) = \sqrt{(x_{Gj}(k) - x_i(i,k))^2 + (y_{Gj}(k) - y_i(i,k))^2 + (z_{Gj}(k) - z_i(i,k))^2} \quad \text{[MATH 7]}$$

$$PR'_{cal}(i, n, k) = \sqrt{\begin{array}{c}(x'_{Gj}(n,k) - x_i(i,n))^2 + (y'_{Gj}(n,k) - y_i(i,n))^2 + \\ (z'_{Gj}(n,k) - z_i(i,n))^2\end{array}}$$

Again during the computation sub-step 171, the processing module 20 computes the residue $R_{G_j}(k,n)$ according to the formula:

$$R_{Gj}(k, n) = \quad \text{[MATH 8]}$$
$$\sum_{i=1}^{m}[(PR(i,k) - PR_{cal}(i,k)) - (PR'(i,n,k) - PR'_{cal}(i,n,k))]^2$$

which is equivalent to:

$$R_{Gj}(k, n) = \sum_{i=1}^{m}\left[\sum_{n=0}^{p} DR(i, k-n) - (PR_{cal}(i,k) - PR'_{cal}(i,n,k))\right]^2.$$

By approximating the residue $R_{G_j}(k,n)$ by linearization, the residue is expressed by the formula:

$$R_{Gj}(k,n) = \|Z_k - H_k\widehat{X_k}) - (Z_{n,k} - H_n\widehat{X_{n,k}})\|^2 \quad \text{[MATH 9]}$$

Again during the computation sub-step 171, if the difference between the definite position of the GNSS receiver 10 at the instant of generation $t_k$ and at the instant of birth $t_n$ is less than a second threshold, then the computation of the residue is simplified. Indeed, if the position of the GNSS receiver 10 has varied slightly between the instant of birth $t_n$ and the instant of computation $t_k$, then the first $H_k$ and second $H_n$ observation matrices are substantially similar. The computation module 20 then computes the approximate solution of the second position deviation vector $\widehat{X_n}$ from the first observation matrix $H_k$. Similarly, the computation of the residue $R_{G_j}(k,n)$ is then expressed according to the following formula:

$$R_{Gj}(k,n) = \|Z_k - Z_{n,k} - H_k(\widehat{X_k} - \widehat{X_{n,k}})\|^2. \quad \text{[MATH 10]}$$

During a detection sub-step 172, if for at least one group $G_j$ of satellites, the residue $R_{G_j}(k,n)$ is greater than the first threshold, the processing module 20 detects masking of at least one satellite of the group $G_j$.

If, for at least one group $G_j$, the processing module 20 has detected, during the detection sub-step 172, a masking, and if the group $G_j$ comprises at least six satellites, then the processing module 20 reiterates, during a reiteration sub-step 173, the computation sub-step 171 for each subgroup of the group $G_j$, then producing a new residue specific to said subgroup. Each subgroup is distinct from the other subgroups and includes all but one of the satellites in the group $G_j$.

In a determination sub-step 174, if the new residue of a subgroup is below a second threshold while the respective new residues of the other subgroups linked to the same group $G_j$ are above the second threshold, the processing module 20 then determines a respective masked satellite as being the satellite absent from the subgroup. The second threshold is e.g. equal to the first threshold.

As an example, in the case of FIG. 4, if the residue $R_{G_2}(k,n)$ linked to the second group $G_2$ is greater than the first threshold, then the processing module 20 detects, during the detection sub-step 172, the masking of at least one satellite of the second group $G_2$. If, moreover, the new residue associated with the subgroup in which the third satellite $S_3$ is absent is less than the second threshold, and the new residues correspondingly associated with the other subgroups from the second group $G_2$ are greater than the second threshold, the processing module 20 then determines that the third satellite $S_3$ is masked.

The generation 130, association 140 and detection 170 steps are reiterated periodically at a second predetermined frequency $f_2$. The second frequency $f_2$ is e.g. equal to the first frequency $f_1$. Thus, on each reception of GNSS signals by the input module 17, the processing module 20 generates new groups, associates a date of birth with each new group $G_j$ and detects masking within the new groups $G_j$.

In a variant, the second frequency $f_2$ is lower than the first frequency $f_1$. The first frequency $f_1$ is e.g. twice the second $f_2$ frequency. The generation 130, association 140 and detection 170 steps are then reiterated each time the GNSS signals are received twice by the input module 10.

During a communication step 180, the output module 25 communicates to a user or to the computation module 13 a warning signal if a masked satellite has been detected during the detection step 170. Furthermore, the output module 25 communicates to the user or to the computation module 13, the list of masked satellites if the list has been determined during the detection step 170.

With the method according to the invention, the detection of masked satellite(s) is improved because the detection can be carried out on an on-board system from a low computational power, in particular by means of the formation of group(s) $G_j$.

Furthermore, with the formation according to the substeps of the generation step, the groups $G_j$ having a small number of satellites but a long valid reception period without discontinuity and groups $G_j$ having a short valid reception period without discontinuity but a large number of satellites, can be used for better masking detection and better determination of the list of masked satellites.

Furthermore, the selection sub-step 131 ensures that the data coming from the GNSS signals received from the satellites can be used in the detection of a masking of satellite(s).

The invention claimed is:

1. A method for detecting masking of one or a plurality of satellites by an obstacle, for a GNSS receiver on a mobile carrier, the method comprising:
   continuous reception, at each acquisition instant and for each of M satellites, of a code pseudo-distance measurement, and a variation of carrier pseudo-distances, M being an integer;
   computation of a definite position of the receiver and of a computed position of each satellite;
   detection of a masking of at least one satellite, comprising:
      for each satellite and for each acquisition instant, computation, at an instant of computation, (i) of a pseudo-distance computed from the definite position of the receiver and the computed position of each satellite, and (ii) of a reconstructed pseudo-distance at an earlier instant from the code pseudo-distance and each variation of carrier pseudo-distance between the earlier instant and the instant of computation; and
      detection of a masking of at least one satellite by analyzing a quantity called residue computed by applying a least squares algorithm, from the measurement of code pseudo-distances at the instant of computation, of the definite positions of the receiver and the computed positions of each of the satellites at the instant of computation and at the earlier instant, the computed pseudo-distances and the reconstructed pseudo-distances.

2. The method according to claim 1, comprising prior to said computation of a pseudo-distance and of a reconstructed pseudo-distance:
   generation at an instant, called instant of generation, of at least one group of N satellites, the satellites of the or each group of N satellites being chosen from the M satellites, N being an integer less than or equal to M; and
   for the or each group of N satellites, association of an instant of birth preceding the instant of generation from which the GNSS signals from each of the satellites in the group of N satellites were all received uninterruptedly,
wherein said detection is iterated for each group, and
wherein, during said computation of a pseudo-distance and of a reconstructed pseudo-distance, the instant of computation is equal to the instant of generation, and the earlier instant is equal to the instant of birth of the group.

3. The method according to claim 2, wherein said detecting comprises for each group, subsequent to said computation of a pseudo-distance and of a reconstructed pseudo-distance:
   if, for at least one group of satellites, the residue is greater than a first threshold, then detection of masking of at least one satellite in the group and reiteration of said computing the residue for each subgroup of the group comprising each satellite of the group except one; and
   if, for a subgroup, the residue is less than a second threshold, then determination of a masked satellite as being the satellite absent from the subgroup.

4. The method according to claim 1, wherein said computation of a definite position and a computed position comprises, for each acquisition instant:
   computation of an estimated signal-to-noise ratio; and
   computation of an elevation angle of each satellite from the definite position of the GNSS receiver and the computed position of that satellite.

5. The method according to claim 3, wherein said computing the residue further comprises for each satellite group:
   computation of a reconstructed pseudo-distance for each satellite, from the code pseudo-distance at instant of generation and the variations of carrier pseudo-distance between the instant of birth and the instant of generation;
   computation of a first, a second, approximate solution respectively, of a first, a second linear system respectively, each linear system correspondingly depending on the first and the second computed pseudo-distances, on the code pseudo-distance at the instant of generation and on the reconstructed pseudo-distance; and
   computation of the residue from the first and second approximate solutions.

6. The method according to claim 2 wherein said generation, said association (140) and said detection are reiterated periodically.

7. A computer program product including software instructions which, when executed by a computer equipment, cause the computer equipment to implement a detection method according to claim 1.

8. An electronic detection device comprising technical means suitable for implementing the detection method according to claim 1.

9. The method according to claim 2, wherein said computation of a definite position and a computed position comprises, for each acquisition instant:
   computation of an estimated signal-to-noise ratio; and
   computation of an elevation angle of each satellite from the definite position of the GNSS receiver and the computed position of that satellite.

10. The method according to claim 9, wherein said generation comprises selecting, for each satellite, GNSS signals at each instant of acquisition for which:
    the signal-to-noise ratio of the GNSS signals coming from the satellite at the instant meets a first criterion, and
    the elevation angle of the satellite at the instant meets a second criterion.

11. The method according to claim 10, wherein said generation further comprises:
    generation of a first group comprising the satellites, the GNSS signals from which are selected, during said selecting, since an instant which is the earliest with respect to the instant of generation;
    generation of a second group from the first group, the second group comprising each satellite of the first group and the satellite, absent from the first group, the GNSS signals from which are selected, during said selecting, since an instant which is the earliest with respect to the instant of generation; and
    if at least one satellite the GNSS signals from which have been selected during said selection at the instant of generation, is absent from each group already generated, then reiteration of said generation of a second group from the last group generated.

\* \* \* \* \*